Aug. 2, 1966    W. O. BAKER ETAL    3,263,811
SKIM FILTER
Filed Feb. 28, 1963

WILLIAM O. BAKER
ERNEST A. RODRIGUEZ
INVENTORS.

BY Flam and Flam
ATTORNEYS.

United States Patent Office 3,263,811
Patented August 2, 1966

3,263,811
SKIM FILTER
William O. Baker, West Covina, and Ernest A. Rodriguez, La Puenta, Calif., assignors to Shamrock Pool Equipment Company, El Monte, Calif., a corporation of California
Filed Feb. 28, 1963, Ser. No. 261,698
8 Claims. (Cl. 210—136)

This invention relates to swimming pool equipment and particularly to a combination skimmer-filter.

Combination skim filters have been provided in the past. For example, a large tank, usually metal, is installed in the decking surrounding a swimming pool. The tank has a branch forming a skimming channel in which a weir is located for trapping large foreign objects. A diatomaceous earth or other filter may be removably accommodated in the tank. Normally such skim tanks are installed when the pool is built and are not easily installed after a pool is built. Nor are such skim filter tanks adapted or designed for use with above-ground pools.

The primary object of this invention is to provide a combination skim filter adapted and designed for installation in existing pools, and especially above-ground pools.

Another object of this invention is to provide a skim filter of this character that can be mounted in a unique manner whereby installation is accomplished simply and whereby the filter element can readily be removed for servicing or replacement.

Another object of this invention is to provide a new effective means for trapping larger debris in the skimmer.

Still another object of this invention is to provide a housing for a skim filter that is readily moldable.

Still another object of this invention is to be provide, with the aid of the skim filter, an effective circulation system for swimming pools.

Still another object of this invention is to provide a skim filter designed for use with standard cylindrical filter cartridges.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in limiting sense, since the scope of the invention is best defined by the appended claims.

Referring to the drawings.

Figure 1:
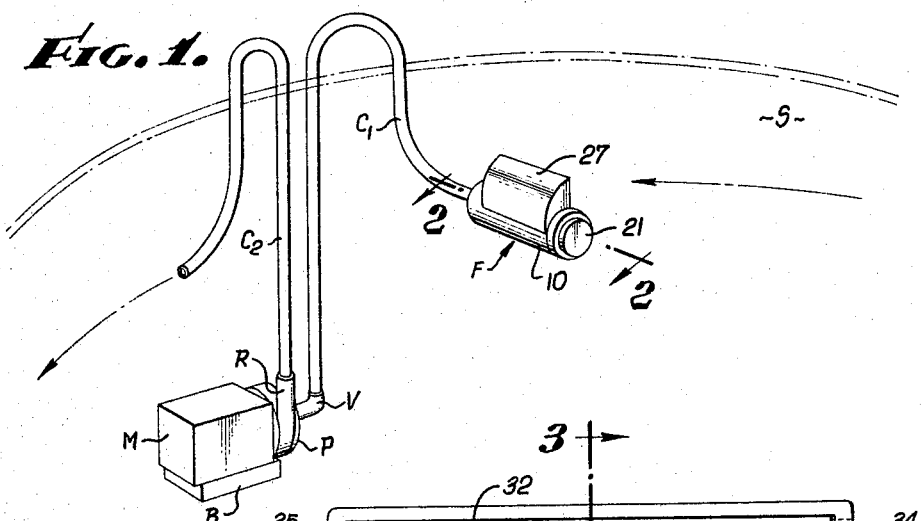
FIGURE 1 is a pictorial view illustrating a circulation system for an above-ground swimming pool, and showing a typical installation for the skim filter.

In FIG. 1 there is illustrated a swimming pool S, in this example of the above-ground type. A skim filter F is located just inside the rim of the pool and at the level of water in the pool. The water is drawn into the skim filter F by the aid of a pump P. The pump P and a motor M for operating the pump P rest upon a small pad or block B placed on the ground just outside the swimming pool S.

The pump P has a vacuum fitting V that connects to the filter F by the aid of a plastic pipe or cane $C_1$. The cane $C_1$ extends vertically upwardly along the outside of the side wall of the pool and then curves so as to clear the rim of the pool. The inner end of the cane $C_1$ is located adjacent the surface and provides a mounting for the filter F in a manner hereinafter to be described.

The pump P also has a return fitting R upon which is mounted a cane $C_2$ for return of filtered water to the swimming pool S. The cane $C_2$ has an upstanding part extending along the peripheral wall of the swimming pool S, an intermediate bend that clears the rim of the swimming pool, and an end directed generally in a tangential direction away from the filter F so as to produce a circular current of the water in the swimming pool S. The filter F is addressed so as to intercept this current substantially at the end of its 360° course and adjacent the wall of the swimming pool S. The induced circular current channels debris toward the filter F for its removal.

The filter F has a housing which may be formed of plastic by a blow molding process or by injection molding, for example. The housing has a cylindrical part 10. One end of the housing is open, the other end has a wall 11 provided with a central circular opening 12. Extending inwardly from this opening is a generally cylindrical thin walled flange 13. Preferably both the inner and outer surfaces of the flange have a slight conical inward convergence for purposes presently to appear. The end of the pipe or cane $C_1$ has a horizontally extending end that is wedged into the converging flange 13. The filter F is thereby mounted, and communication between the interior of the housing 10 and the pump intake, as at the vacuum fitting V, is established, the flange 13 providing a seal.

A hollow cylindrical filter cartridge 14 is accommodated, with substantial peripheral clearance, in the filter housing 10. The cartridge may be inserted and removed through the open end of the housing. The cartridge 14 includes a metal or plastic core 15 perforated throughout its length that serves as a support for filter material 16 placed about it. This filter material 16 and a peripheral wrapper 17 may be made of any suitable material such as plastic, fabric, paper or the like.

One end of the core telescopes over the thin walled flange 13 to form an effective seal therewith and to place the interior of the core 15 in communication with the pump intake. The opposite end of the core is provided with a closure 19 made of suitable flexible and resilient material such as polyethylene or the like. The closure 19 is press-fitted into the core 15, with its peripheral flange 20 engaging about the end edges of the core 15. Water drawn into the cane $C_1$ must of necessity pass through the filter material 16 since seals for the core 15 are provided at opposite ends at the cap 19 and the flange 13.

In order to close the open end of the housing 10 and also to support the end of the filter cartridge 14 remote from the cane $C_1$, a cap 21 is provided. The cap 21 is made of the same material as the housing 10, and may conveniently be formed in the same mold therefor. The cap 21 has a peripheral flange divided into larger and smaller adjoining parts by an intermediate annular wall 22. This wall joins an outer cylindrical part 23 to the inner cylindrical part 24. The inner cylindrical part 24 and the bottom of the cap 21 form a recess in which the end of the cartridge 14 is fitted. The outer cylindrical flange part 23 is designed to fit over the end of the housing 10, with the end edge of the housing 10 in engagement with the wall 22.

Figure 2:
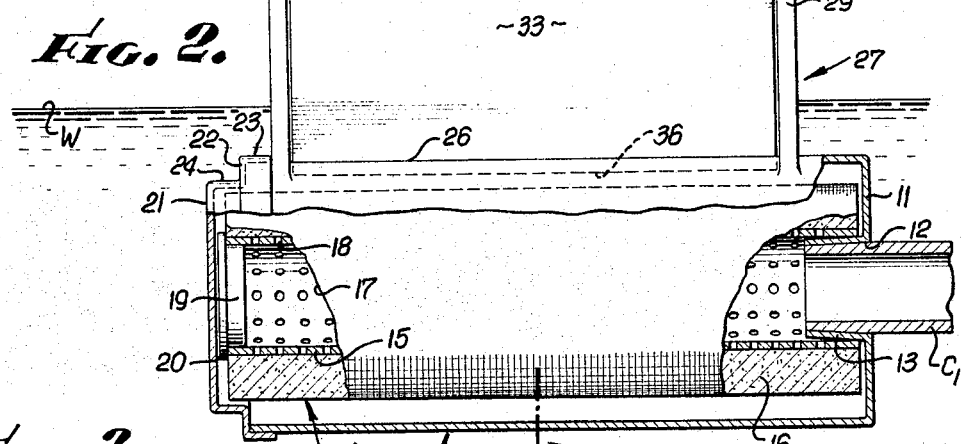
FIG. 2 is a front elevational view of the skim filter with parts broken away and shown in section.

Water enters the space about the cartridge 14 via an opening 25 (FIG. 3) to the cylindrical part of the housing 10. One edge 26 of the opening is parallel to the housing axis and extends along the top of the cylindrical part of the housing 10, but terminating short of the housing ends, as shown in FIG. 2. Opposite side edges of the opening 25 each extend arcuately approximately 90° about the cylindrical part of the housing. This edge 26 forms the operative skimming edge of the skimmer in a manner presently to be described.

A cowl 27, forming an integral part of the housing, has a rear curved wall 28 that merges with and extends tangentially of the cylindrical part of the housing 10 between the side edges of the opening 25 opposite the skimming edge 26. The upper end of the cowl wall 28 is vertically spaced above the edge 26. The cowl 27 furthermore has two arcuate end walls 29 and 30 that extend upwardly from the side edges of the opening 25 and join with the sides of the rear wall 28. The side walls 29 and 30 also have segments, as at 31 (FIG. 3), projecting forwardly of the skimming edge 26 to define a channel thereto.

The filter F is so situated that the normal level W of water falls slightly above the edge 26 of the housing opening 25 to provide a skimming effect, but high enough to supply the demands of the pump. The top edge 32 of the cowl is well above the level W.

In order to trap larger debris, such as leaves, in the filter housing 10, a closure plate 33 is provided. This closure plate 33 is rectangular and fits within the generally rectangular opening defined by the cowl 27. Pins 34 and 35 at the apices of the side walls 29 and 30 provide a hinge mounting for the plate 33 so that it is swingable about a horizontal axis just within the top edge 32 of the cowl. The side edges of the plate 33 have only slight clearance with respect to the inner surfaces of the cowl end walls 29 and 30. The lower edge 36 of the closure plate projects below the skimming edge 26.

The filter housing 10 is angularly adjusted about the cane $C_1$ so that the axis of movement of the plate 33 lies vertically above the skimming edge 26. Accordingly, the plate 33 seeks a position due to its own weight (shown in full lines in FIG. 3) in which its lower edge 36 lies just behind the skimming edge 26 which limits its forward movement. Due to the gravity bias of the plate, a check valve type of arrangement is provided.

Figure 3:
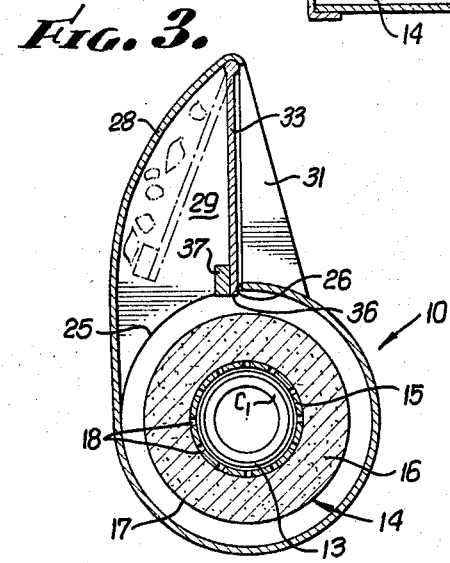
FIG. 3 is a sectional view taken along the plane corresponding to line 3—3 of FIG. 2.

Thus, when the pump P is operated, induced flow of water moves the plate 33 rearwardly, for example, to the phantom-line position illustrated in FIG. 3. Larger debris is trapped behind the plate since such debris cannot flow against the prevailing current. Just as soon as the pump is shut down, the cover plate 33 moves to the full-line position to trap the debris in the filter. In order to assist the movement of the plate 33 to the closed position illustrated, there may be provided a supplemental weight, as at 37.

Figure 4:
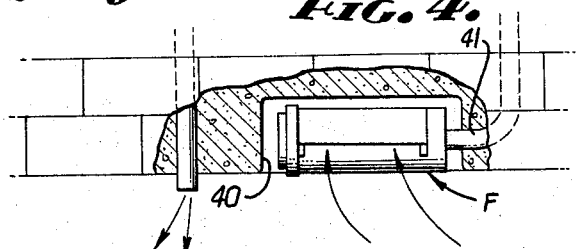
FIG. 4 is a plan view showing an alternate method for incorporating the skim filter in a swimming pool circulation system.

In the form of the invention illustrated in FIG. 4, a filter F is shown accommodated in a recess 40 in the concrete wall of the swimming pool. The filter is mounted on the end of a pipe 41 that projects horizontally into one side of the recess. The distance between the end walls of the recess 40 is adequate to allow the filter to be removed from or placed upon the pipe 41. The operation of the filter F in this example is similar.

Any inlet fitting to an existing swimming pool may be provided with an adapter by the aid of which the present skim filter can be mounted.

The inventors claim:

1. In apparatus for skimming a body of liquid: a housing having an interior space for receiving a portion of a body of liquid, and having a skimming edge and presenting an opening, through which liquid can flow from the body to the housing said opening being defined at its bottom by said skimming edge and being disposed so that the surface of the liquid of the body is at a level which covers only part of said opening; said housing having an outlet cooperable with the suction side of a pump for withdrawing liquid from said housing space so that the liquid tends to flow into said housing through the opening; a filter in the housing below said skimming edge; and a closure plate mounted on said housing for movement relative to said edge and biased to close the opening at the area of said skimming edge to trap material behind said skimming edge, said closure having an area presented to the course of current of liquid entering said space for automatic movement away from said edge upon the existence of such current.

2. In apparatus for skimming a body of liquid: means forming a space for receiving a portion of a body of liquid, and having a skimming edge and presenting an opening through which liquid can flow from the body to the space forming means, said opening being defined at its bottom by said edge and being disposed so that the surface of the liquid of the body is at a level which covers only part of said opening; means forming an outlet from said space cooperable with the suction side of a pump for withdrawing liquid from said space so that the liquid tends to flow into said space-forming means through the opening; a filter in the housing below said skimming edge; and a closure movable relative to said edge and biased to close said opening at the area of said skimming edge to trap material behind said skimming edge, said closure being movably mounted to project in the course of the current of liquid entering said space for automatic movement away from said edge upon the existence of such current.

3. In apparatus for skimming a body of liquid: a housing having a first hollow part open at one end, the other end of said first part having an annular flange forming an outlet from the housing, said flange extending inwardly of the first part; a filter cartridge replaceably received in said first part at said open end, and having a core sealingly fitting said flange by telescopic engagement therewith; conduit means sealingly fitting the first housing part at said flange and adapted to be connected with the suction side of a pump for withdrawing liquid from said housing; a detachable cap for said open end; a plug sealing the other end of said cartridge core; said cap having a recess supporting the said other end of said cartridge, and cooperating with said flange for holding said cartridge in position within said first housing part so that the peripheral portion of said cartridge has clearance within the said first housing part; said first part having a lateral opening defined in part by a skimming edge located above the filter cartridge; said housing having a second part forming a channel to said skimming edge; and a closure mounted on said second housing part and biased to close said channel for trapping debris within said housing upon cessation of liquid flow through said housing.

4. In apparatus for skimming a body of liquid: a housing having a first hollow part open at one end, the other end of said first part having an annular flange forming an outlet from the housing, said flange extending inwardly of the first part; a filter cartridge replaceably received in said first part at said open end, and having a core sealingly fitting said flange by telescopic engagement therewith; conduit means sealingly fitting the first housing part at said flange and adapted to be connected with the suction side of a pump for withdrawing liquid from said housing; a detachable cap for said open end; means sealing the other end of said cartridge core; said first part having a lateral opening defined in part by a skimming edge located above the filter cartridge; said housing having a second part forming a channel to said edge; and a closure mounted on said second housing part and biased to close said channel for trapping debris within said housing upon cessation of liquid flow through said housing.

5. In apparatus for skimming a body of liquid: a housing having a first substantially cylindrical hollow part open at one end, the other end of said cylindrical part having an annular flange forming an outlet from the housing, said flange extending inwardly of the said one end of said cylindrical part and at the axis thereof; a replaceable filter cartridge received in said cylindrical part at said open end, and having a core sealingly fitting said flange by telescopic engagement therewith; conduit means sealingly fitting said cylindrical part at said flange and adapted to be connected with the suction side of a pump for withdrawing liquid from the housing; a plug sealing the other end of said cartridge core; a detachable cap telescopically cooperable with said open end for closing said open end, said cap having an interior annular recess forming a seat in which the corresponding cartridge end is received; said cartridge having peripheral clearance in said cylindrical housing part; said cylindrical part having a lateral opening defined in part by a skimming edge located above the filter cartridge; said housing having a cowl forming a channel to said edge; and a closure plate mounted on said cowl and biased to close said channel for trapping debris within said housing upon cessation of liquid flow through housing.

6. In apparatus for skimming a body of liquid: a housing having an interior space for receiving a portion of a body of liquid, and having a skimming edge and presenting an opening through which liquid can flow from the body to the housing, said opening being defined at its bottom by said skimming edge and being disposed so that the surface of the liquid of the body is at a level which covers only part of said opening; said housing having an outlet cooperable with the suction side of a pump for withdrawing liquid from said housing space so that the liquid tends to flow into said housing through the opening; a closure plate mounted on said housing for movement relative to said edge and biased to close the opening at the area of said skimming edge to trap material behind said skimming edge, said closure having an area presented to the course of current of liquid entering said space for automatic movement away from said edge upon the existence of such current; and a filter unit removably supported in the housing and interposed between said opening and said housing outlet.

7. In apparatus for skimming the water of a swimming pool: wall means forming the peripheral boundary of a swimming pool, and having a top rim; a pump mounted outside the wall means; said pump having a suction fitting and a discharge fitting; pipes respectively mounted on and connected to the fittings and extending over the top rim of the wall means; a hollow housing mounted on the end of the pipe that connects with the suction fitting with the interior of the housing connected to the end of said pipe; said housing having a skimming edge defining an opening positioned to receive a quantity of surface water flowing along the wall means; a filter in the housing below said skimming edge; and closure means movably mounted at said opening and biased to interrupt communication between the interior of the housing and the surface water at said opening to trap material within the housing, said closure being moved to open position in response to flow induced by said pump; the pipe that connects to the discharge fitting having an end adjacent but directed away from said housing to create a peripheral current along the wall means.

8. In apparatus for skimming the water of a swimming pool: wall means forming the peripheral boundary of a swimming pool, and having a top rim; a pump mounted outside the wall means; said pump having a suction fitting and a discharge fitting; pipes respectively mounted on and connected to the fittings and extending over the top rim of the wall means; a hollow housing mounted on the end of the pipe that connects with the suction fitting with the interior of the housing connected to the end of said pipe; said housing having a skimming edge defining an opening positioned to receive a quantity of surface water flowing along the wall means; and closure means movably mounted at said opening and biased to interrupt communication between the interior of the housing and the surface water at said opening to trap material within the housing, said closure being moved to open position in response to flow induced by said pump; the pipe that connects to the discharge fitting having an end adjacent but directed away from said housing to create a peripheral current along the wall means and a replaceable filter cartridge mounted within said housing and interposed between the said skimming opening and its mounting pipe.

References Cited by the Examiner

UNITED STATES PATENTS

| | | | |
|---|---|---|---|
| 1,192,757 | 7/1916 | Davis | 210—136 |
| 2,413,991 | 1/1947 | Newman | 210—457 |
| 2,900,079 | 8/1959 | Pace | 210—169 |
| 2,904,186 | 9/1959 | Moore | 210—437 |
| 3,036,712 | 5/1962 | Barbara | 210—169 |
| 3,125,513 | 3/1964 | Johnson | 210—169 |
| 3,152,076 | 10/1964 | Kreutzen | 210—242 X |

REUBEN FRIEDMAN, *Primary Examiner.*

F. A. SPEAR, *Assistant Examiner.*